(12) United States Patent
Dekate et al.

(10) Patent No.: US 9,170,129 B2
(45) Date of Patent: Oct. 27, 2015

(54) FIBER OPTIC SENSOR FOR POSITION SENSING

(71) Applicant: GENERAL ELECTRIC COMPANY, Schenectady, NY (US)

(72) Inventors: Sachin Narahari Dekate, Niskayuna, NY (US); Glen Peter Kose, Niskayuna, NY (US); Aaron Jay Knobloch, Guilderland, NY (US); Boon Kwee Lee, Clifton Park, NY (US); Sameer Dinkar Vartak, Bangalore (IN); Seema Somani, Bangalore (IN)

(73) Assignee: General Electric Company, Niskayuna, NY (US)

( * ) Notice: Subject to any disclaimer, the term of this patent is extended or adjusted under 35 U.S.C. 154(b) by 87 days.

(21) Appl. No.: 14/056,208

(22) Filed: Oct. 17, 2013

(65) Prior Publication Data

US 2015/0108335 A1 Apr. 23, 2015

Related U.S. Application Data

(63) Continuation of application No. 13/731,239, filed on Dec. 31, 2012.

(51) Int. Cl.
*G01D 5/26* (2006.01)

(52) U.S. Cl.
CPC ............... *G01D 5/268* (2013.01); *G01D 5/266* (2013.01)

(58) Field of Classification Search
CPC ............................... G01D 5/268; G01D 5/266
USPC ........... 250/225; 324/207.13, 244.1; 356/375, 356/493; 73/763

See application file for complete search history.

(56) References Cited

U.S. PATENT DOCUMENTS

| | | | |
|---|---|---|---|
| 5,736,856 A | 4/1998 | Oliver et al. | |
| 5,859,531 A | 1/1999 | Maurice et al. | |
| 6,118,539 A | 9/2000 | Gaumont et al. | |
| 6,756,781 B2 | 6/2004 | Duncan et al. | |
| 7,521,922 B2 | 4/2009 | Stuve | |
| 2012/0001625 A1* | 1/2012 | Yamada et al. | 324/244.1 |

OTHER PUBLICATIONS

Lawrence et al., "A fiber optic sensor for transverse strain measurement," Experimental Mechanics, vol. 39, Issue 3, pp. 202-209, 1999.
Alam et al., "Birefringence Properties of Side-Hole Optical Fibers," ICCT International Conference on Communication Technology, pp. 1-4, Nov. 27-30, 2006.

(Continued)

*Primary Examiner* — Renee D Chavez
(74) *Attorney, Agent, or Firm* — John P. Darling

(57) ABSTRACT

A system for sensing the position of a movable object includes a polarization maintaining fiber configured to receive light from a light source; an optical system configured to rotate an angle of polarization of the light by a first predetermined angle; a low birefringence fiber connected to the optical system at a first end and having a mirror connected to a second end configured to reflect the light and rotate the angle of polarization at a second predetermined angle, the second end being configured to overlap a magnetic field of the a magnet attached to the object. The angle of polarization is rotated to a third predetermined angle proportional to at least one of the strength of the magnetic field and an amount of the overlap. The optical system is configured to decompose the third predetermined angle into a first component and a second component. A detector is configured to detect a differential between the first and second components indicative of the amount of the overlap.

8 Claims, 2 Drawing Sheets

(56) References Cited

OTHER PUBLICATIONS

Drexler et al., "Utilization of Faraday Mirror in Fiber Optic Current Sensors," RadioEngineering, vol. 17, Issue 4, pp. 101-107, Dec. 2008.

M. Aerssens et al., Faraday Effect Based Optical Fiber Current Sensor for Tokamaks, 2nd International Conference on Advancements in Nuclear Instrumentation Measurement Methods and their Applications (ANIMMA), pp. 1-6, Jun. 6-9, 2011.

* cited by examiner

FIBER OPTIC SENSOR FOR POSITION SENSING

BACKGROUND OF THE TECHNOLOGY

The present technology generally relates to the use of fiber optics to measure position. More particularly, the present technology relates to magneto-optic position detection in aviation environments.

Conventional methods of measuring position include linear variable differential transformers (LVDT), laser vibrometers, optical gap sensors, Hall-effect sensors, etc. Some of these techniques are mature but cannot be used in some harsh environments such as experienced by aviation controls. Other techniques such as the LVDT are currently used in measuring position, but have a certain space and weight limit associated with them. Current position measurement systems that rely on linearly variable differential transformers are relatively bulky and require heavy shielded wiring from the measurement point to the full authority digital engine control (FADEC). The number of sense points on an engine may number in the hundreds. The relative size and weight of these sensors and their wiring becomes a significant issue. Hall-effect sensors are currently being looked at as potential replacement for LVDT based sensors, however they are still in the development/test phase.

Although there have been several approaches to magneto-optic position sensing, most of them are limited in range as they use the magnitude of magnetic field as a mechanism. As magnetic field decays rapidly away from magnet, this approach has a limited range. One approach uses a magnetic encoder plate but it is limited by the complexity of multiple fibers. Another approach uses multiple magnets to create a relatively large length over which the magnitude of the magnetic field remains relatively constant.

BRIEF DESCRIPTION OF THE TECHNOLOGY

According to one example of the technology, a system for sensing the position of a movable object having a first magnet attached to the object comprises a polarization maintaining fiber configured to receive light from a light source; an optical system configured to rotate an angle of polarization of the light by a first predetermined angle; a low birefringence fiber connected to the optical system at a first end and having a mirror connected to a second end configured to reflect the light and rotate the angle of polarization at a second predetermined angle that is twice the first predetermined angle, the second end being configured to overlap a magnetic field of the first magnet at at least one position of the movable object, wherein the angle of polarization will be rotated to a third predetermined angle proportional to at least one of the strength of the magnetic field and an amount of the overlap, and the optical system is configured to decompose the third predetermined angle into a first component and a second component; and a detector operatively connected to the optical system configured to detect a differential between the first and second components indicative of the amount of the overlap.

According to another example of the technology, a method of for sensing the position of a movable object having a first magnet attached to the object comprises rotating an angle of polarization of light in a fiber by a first predetermined angle; reflecting the light and rotating the angle of polarization at a second predetermined angle that is twice the first predetermined angle, the second end being configured to overlap a magnetic field of the first magnet at at least one position of the movable object; rotating the angle of polarization to a third predetermined angle proportional to at least one of the strength of the magnetic field and an amount of the overlap; decomposing the third predetermined angle into a first component and a second component; and detecting a differential between the first and second components indicative of the amount of the overlap.

BRIEF DESCRIPTION OF THE DRAWINGS

Other aspects and advantages of this technology will be better appreciated from the following detailed description with reference to the drawings, in which.

DETAILED DESCRIPTION OF THE TECHNOLOGY

Figure 1:
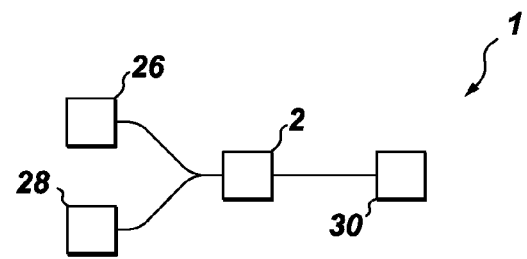
FIG. 1 schematically represents a position sensing system according to an example of the technology.

Referring to FIG. 1, a position sensing system 1 may include a sensor 30 connected to optical components 2. A light source 26 provides light to the optical components 2 and a detector 28 detects changes in angle of polarization of the light based on an amount of overlap the sensor has with a magnetic field. The detector 28 may be a polarimetric or interferometric detector.

Figure 2:
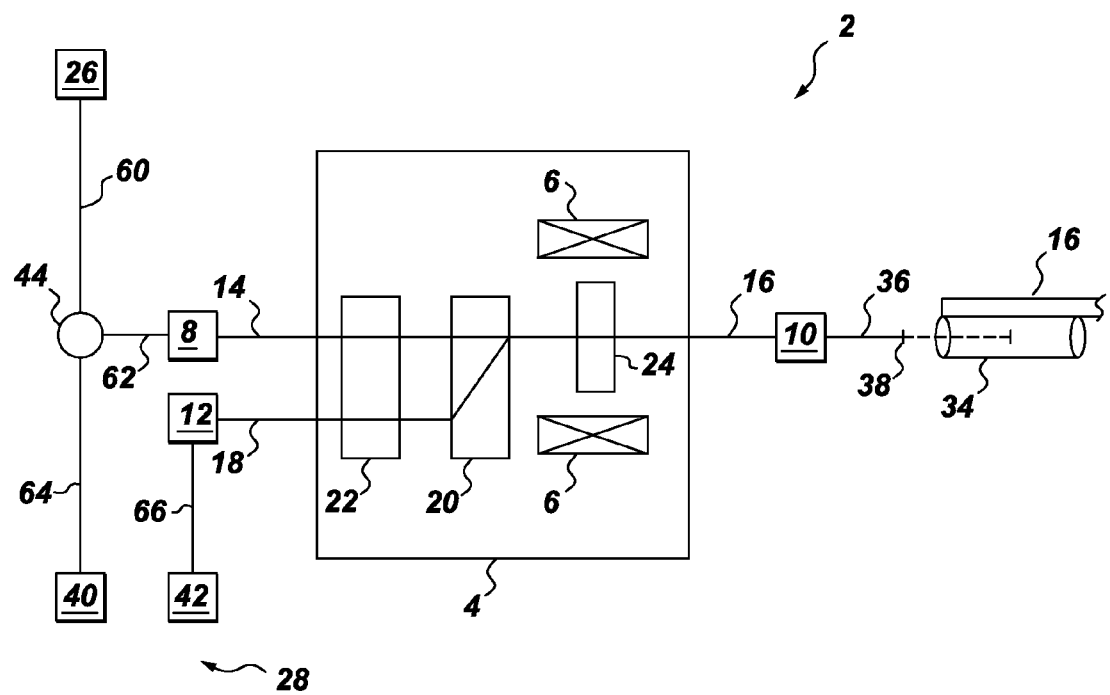
FIG. 2 schematically represents an example of a position sensing system shown in FIG. 1.

Referring to FIG. 2, the optical components 2 receive light from the light source 26 that is connected to a circulator 44 by a fiber (e.g. fiber optic cable) 60. The light is transmitted from the circulator 44 to a fiber 62 that is connected to a first polarization maintaining fiber (PMF) 14 by a first connector 8. It should be appreciated that the fibers 62, 14 may be a single fiber without the use of a connector. The first PMF 14 extends into a magnetic shield 4 which may be, for example, a Faraday shield or cage or a metal pipe, that contains the optical components 2. The first PMF 14 extends through a ferrule 22, a birefringence crystal 20, and a Faraday rotator 24 and magnet 6. The Faraday rotator 24 and magnet 6 rotate the angle of polarization of the light in the first PMF 14 by a first angle of polarization 46 (FIG. 3) having a value α. A fist low birefringence fiber 16 extends from the Faraday rotator 24. The first low birefringence fiber 16 enhances the sensitivity of the transmitted light to magnetic fields.

The first low birefringence fiber 16 is connected to a second low birefringence fiber 36 by a second connector 10, although it should be appreciated that the first and second low birefringence fibers 16, 36 may be a single fiber without a connector. The low birefringence fiber(s) 16, 36 may exhibit circular birefringence. A mirror 38 is provided at the end of the second low birefringence fiber 36. An object 32 that's position is to be measured includes a magnet 34. As the object 32 moves, the magnet 34 moves from a position where the magnetic field does not overlap the mirror 38 and the second low birefringence fiber 36 (shown in solid lines in FIG. 2) to a position where the magnetic field of the magnet 34 does overlap the mirror 38 and the second low birefringence fiber 36 (shown in dashed lines in FIG. 2).

In the case of no overlap, the mirror 38 will reflect the light back through the second low birefringence fiber 36, the second connector 10 and the first low birefringence fiber at a second angle of polarization 48 having a value of 2α (i.e. twice the value a of the first angle of polarization 46). In the presence of the magnetic field (i.e. in the case of some overlap), the polarization angle of light propagating in the second low birefringence fiber 36 changes by an amount that is proportional to the strength of the magnetic field and/or the amount of overlap of the second low birefringence fiber 36 and the magnet 34. In the case of overlap, the polarization of the light will be rotated by the magnetic field and reflected by the mirror 38 such that the angle of polarization becomes a third angle of polarization 50 having a value of R.

The light reflected back through the first low birefringence fiber 16 passes back to the optical components 2 and the first PMF 14 through the Faraday rotator 24 and magnet 6. At the polarization beam splitter 20 the angle of polarization of the light is decomposed into the two primary polarization components (x and y) and the two components are transmitted through the first PMF 14 and a single mode fiber (SMF) 18. The first PMF 14 transmits one component of the angle of polarization to a first photodetector 40 through the fiber 62, the circulator 44, and a fiber 64. The SMF 18 may be supported by the ferrule 22 and is connected to a fiber 66 by a third connector 12 to transmit the other component of the polarization angle to a second photodetector 42 through a fiber 66 connected to the SMF 18 by a third connector 12.

Figure 3:
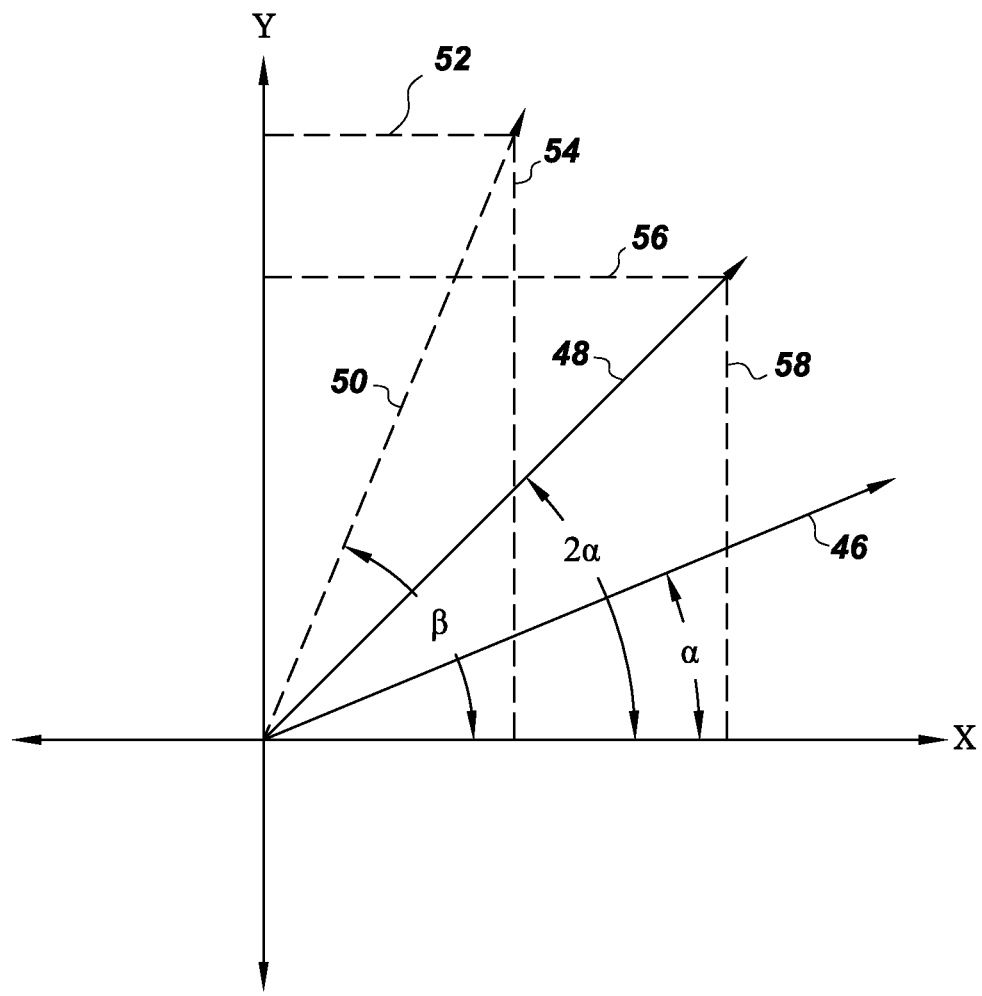
FIG. 3 schematically represents angles of polarization.

Referring to FIG. 3, the first angle of polarization 46 may have a value a of, for example 22.5°. In the case of no overlap of the fiber 36 and the mirror 38 with the magnetic field of the magnet 34, the mirror 38 would reflect the light back at the second angle of polarization 48 having a value 2α of, for example 45°. In that instance, the x component 56 of the second angle of polarization 48 would be equal to the y component 58 of the second angle of polarization 48. Thus, any differences in the x and y components 56, 58 caused by a change in the angle of polarization due to overlap of the fiber 36 with the magnetic field would be detectable by the photodetectors 40, 42 which measure the x and y components 56, 58.

In the case of overlap of the fiber 36 with the magnetic field, the third angle of polarization 50 is split at the birefringence crystal 20 into an x component 52 and a y component 54. A differential measurement of the x and y components 52, 54 provided by the photodetectors 40, 42 provides an indication of the third angle of polarization 50 and thus a measurement of the amount of overlap of the fiber 36 with the magnetic field and a position of the object 32. This method of measuring angle change is robust as it accounts for light fluctuations in the fibers and from the light source.

Although the technology has been described with respect to an example of the second angle of polarization 48 being 45° to provide equal x and y components of the angle of polarization in the case of no overlap of the fiber 36 with the magnetic field, it should be appreciated that the second angle of polarization, and of course the first angle of polarization, may have other values. Moreover, although the technology has been described with respect to an example of the detector 28 being a polarimetric detector, it should be appreciated that the detector 28 may be an interferometric detector with appropriate changes to the optics components 2 to enable interferometric detection of polarization angle change.

The present technology has reduced size and weight compared to conventional technology used in aviation controls and can be used in harsh environments experienced by aviation controls. The present technology can also measure position of aviation control components more accurately, with reduced size and weight, which allows for distributed FADEC architecture and/or more freedom for other system components.

While the present technology has been described in terms of the disclosed examples, it should be appreciated that other forms could be adopted by one skilled in the art. Therefore, the scope of the inventions are to be limited only by the following claims.

The invention claimed is:

1. A system for sensing the position of a movable object having a first magnet attached to the object, comprising:
    a polarization maintaining fiber configured to receive light from a light source;
    an optical system configured to rotate an angle of polarization of the light by a first predetermined angle;
    a low birefringence fiber connected to the optical system at a first end and having a mirror connected to a second end configured to reflect the light and rotate the angle of polarization at a second predetermined angle that is twice the first predetermined angle, the second end being configured to overlap a magnetic field of the first magnet at at least one position of the movable object, wherein the angle of polarization will be rotated to a third predetermined angle proportional to at least one of the strength of the magnetic field and an amount of the overlap, and the optical system is configured to decompose the third predetermined angle into a first component and a second component; and
    a detector operatively connected to the optical system configured to detect a differential between the first and second components indicative of the amount of the overlap.

2. A system according to claim 1, wherein the optical system comprises:
    a magnetic shield;
    a Faraday rotator and a second magnet;
    a birefringence crystal configured to decompose the third predetermined angle into the components; and
    a single mode fiber configured to transmit one of the components to the detector.

3. A system according to claim 1, further comprising:
    a circulator configured to circulate light from the light source to the optical system through the polarization maintaining fiber and to the detector from the optical system through a fiber.

4. A system according to claim 1, wherein the detector is an interferometric detector.

5. A system according to claim 1, wherein the detector is a polarimetric detector.

6. A system according to claim 5, wherein the detector comprises a first photodetector configured to detect a first component and a second photodetector configured to detect a second component.

7. A system according to claim 1, wherein the first predetermined angle is 22.5°.

8. A method of for sensing the position of a movable object having a first magnet attached to the object, the method comprising:
    rotating an angle of polarization of light in a fiber by a first predetermined angle;
    reflecting the light and rotating the angle of polarization at a second predetermined angle that is twice the first predetermined angle, the second end being configured to overlap a magnetic field of the first magnet at at least one position of the movable object;
    rotating the angle of polarization to a third predetermined angle proportional to at least one of the strength of the magnetic field and an amount of the overlap;
    decomposing the third predetermined angle into a first component and a second component; and
    detecting a differential between the first and second components indicative of the amount of the overlap.

* * * * *